United States Patent
Fendt

(10) Patent No.: US 9,821,704 B2
(45) Date of Patent: Nov. 21, 2017

(54) DEVICE AND METHOD FOR CONTROLLING A HEADLAMP OF A MOTOR VEHICLE

(71) Applicant: Conti Temic microelectronic GmbH, Nürnberg (DE)

(72) Inventor: Günter Anton Fendt, Schrobenhausen (DE)

(73) Assignee: Conti Temic Microelectronic GmbH (DE)

( * ) Notice: Subject to any disclaimer, the term of this patent is extended or adjusted under 35 U.S.C. 154(b) by 0 days.

(21) Appl. No.: 15/099,982

(22) Filed: Apr. 15, 2016

(65) Prior Publication Data
US 2016/0311362 A1 Oct. 27, 2016

(30) Foreign Application Priority Data
Apr. 24, 2015 (DE) .................. 10 2015 207 543

(51) Int. Cl.
*G06F 7/00* (2006.01)
*B60Q 1/08* (2006.01)

(52) U.S. Cl.
CPC ........ *B60Q 1/085* (2013.01); *B60Q 2300/112* (2013.01); *B60Q 2300/132* (2013.01); *B60Q 2300/32* (2013.01); *B60Q 2300/45* (2013.01)

(58) Field of Classification Search
CPC ....................................................... B60Q 1/085
USPC .................... 701/49, 400–540; 340/988–996
See application file for complete search history.

(56) References Cited

U.S. PATENT DOCUMENTS

| | | | | |
|---|---|---|---|---|
| 6,078,865 A | * | 6/2000 | Koyanagi | G01C 21/3644 340/988 |
| 2009/0231873 A1 | * | 9/2009 | Kotajima | F21S 48/1159 362/516 |
| 2010/0262975 A1 | * | 10/2010 | Reysa | G06F 9/4843 718/105 |
| 2015/0016128 A1 | * | 1/2015 | Doerne | B60Q 1/085 362/465 |

FOREIGN PATENT DOCUMENTS

| | | |
|---|---|---|
| DE | 10060734 | 6/2002 |
| DE | 10053315 | 3/2003 |
| DE | 10354104 | 6/2005 |
| DE | 102012024627 | 6/2014 |
| DE | 102013213375 | 1/2015 |
| DE | 102013203925 | 10/2015 |

OTHER PUBLICATIONS

German Search Report for German Application No. 10 2015 207 543.5 dated Jan. 21, 2016, including partial translation.

\* cited by examiner

*Primary Examiner* — Muhammad Shafi
(74) *Attorney, Agent, or Firm* — RatnerPrestia

(57) ABSTRACT

A driver assistance system for a motor vehicle, wherein the driver assistance system includes at least one vehicle camera for detecting the vehicle surroundings and a control device having an image data processing unit which is provided for evaluating the image data supplied by the vehicle camera in order to recognize objects along a road being driven on by the motor vehicle, wherein the control device controls at least one headlamp of the motor vehicle as a function of the recognized objects and the respective object priorities thereof in order to illuminate the vehicle surroundings.

16 Claims, 6 Drawing Sheets

FIG 1

| Downhill/uphill gradient |   | Lower/Raise |
|---|---|---|
| Interstate highway |   | Raise |
| Road restricted to motor vehicles | 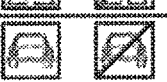 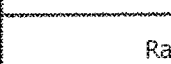 | Raise |
| Speed limit |  | Raise |
| Stop sign |  | Widen and turn light |
| Yield |  | Widen and turn light |
| Traffic circle |  | Widen and turn light |
| Pedestrian zone |  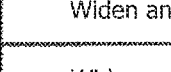 | Widen and turn light |
| 30km/h speed limit zone | 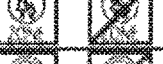  | Widen and turn light |
| Play street |   | Widen and turn light |
| Crosswalk |   | Widen and turn light |
| Pedestrians warning sign |  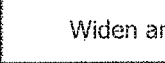 | Dipped headlights and turn light |
| Wild animals crossing warning sign |  | Dipped headlights and turn light |
| Entrance to a town |  | Dipped headlights and turn light |
| Exit from a town | 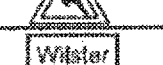 | Dipped headlights |

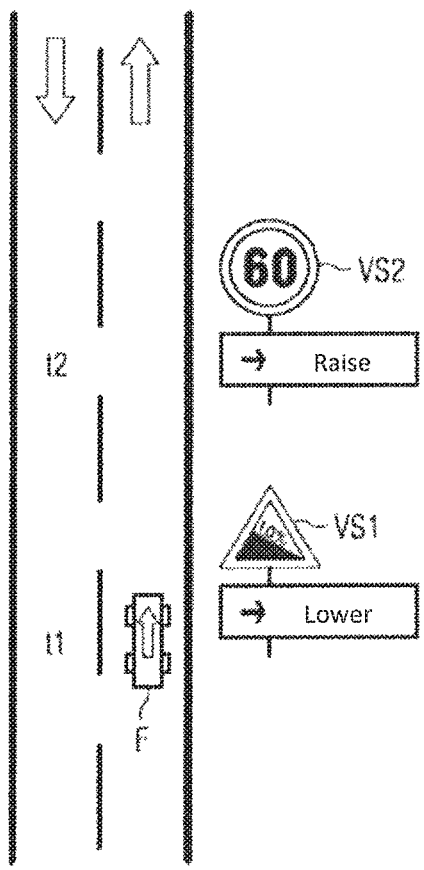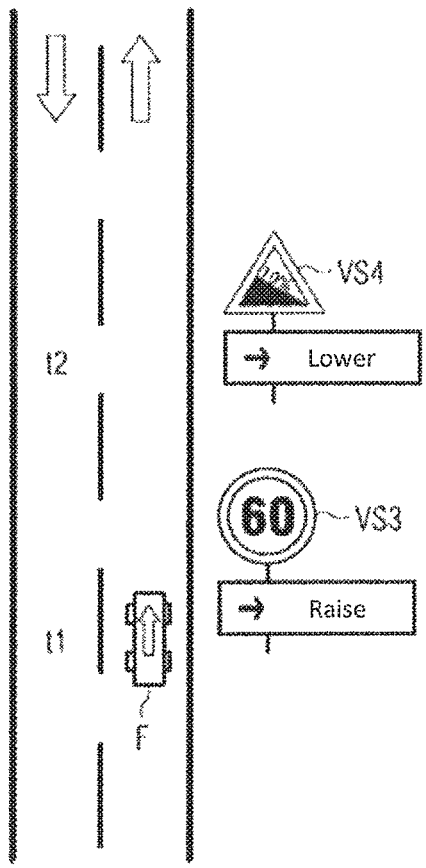

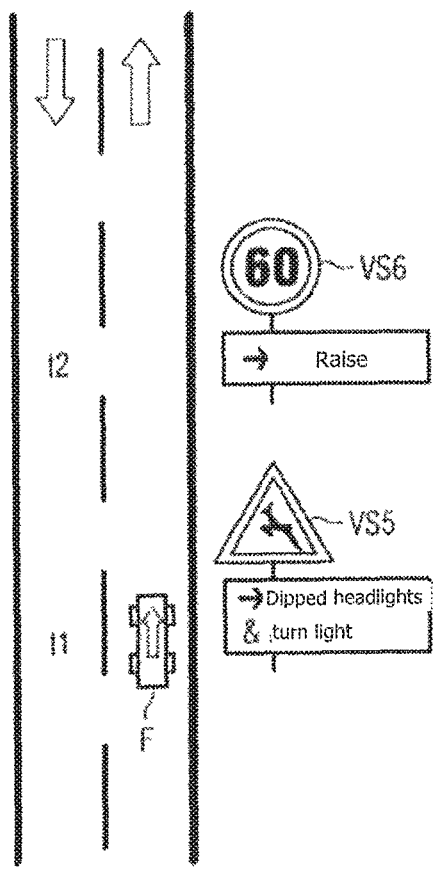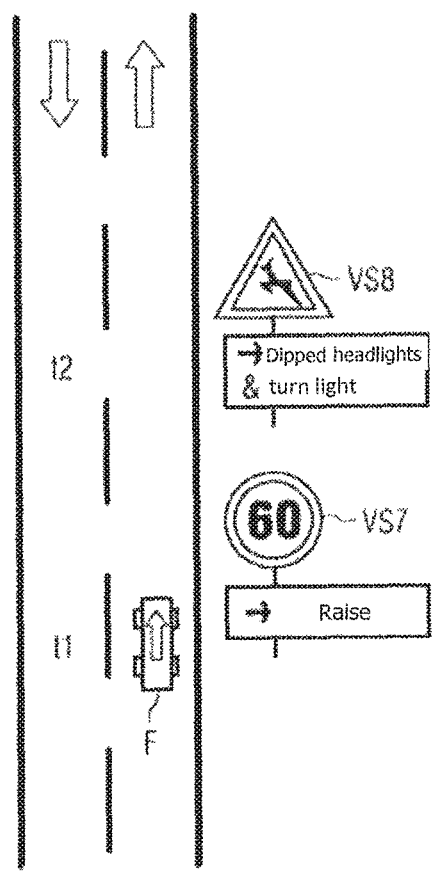

FIG 6

| | | | Priority |
|---|---|---|---|
| Downhill/uphill gradient |   | Lower/Raise | 1 / 4 |
| Interstate highway |   | Raise | 4 |
| Road restricted to motor vehicles |   | Raise | 4 |
| Speed limit |  | Raise | 4 |
| Stop sign |  | Widen and turn light | 2 |
| Yield |  | Widen and turn light | 2 |
| Traffic circle |  | Widen and turn light | 2 |
| Pedestrian zone |   | Widen and turn light | 2 |
| 30km/h speed limit zone |   | Widen and turn light | 2 |
| Play street |   | Widen and turn light | 2 |
| Crosswalk |   | Widen and turn light | 2 |
| Pedestrians warning sign |   | Dipped headlights and turn light | 3 |
| Wild animals crossing warning sign |  | Dipped headlights and turn light | 3 |
| Entrance to a town |  | Dipped headlights and turn light | 3 |
| Exit from to a town |  | Dipped headlights | 4 |

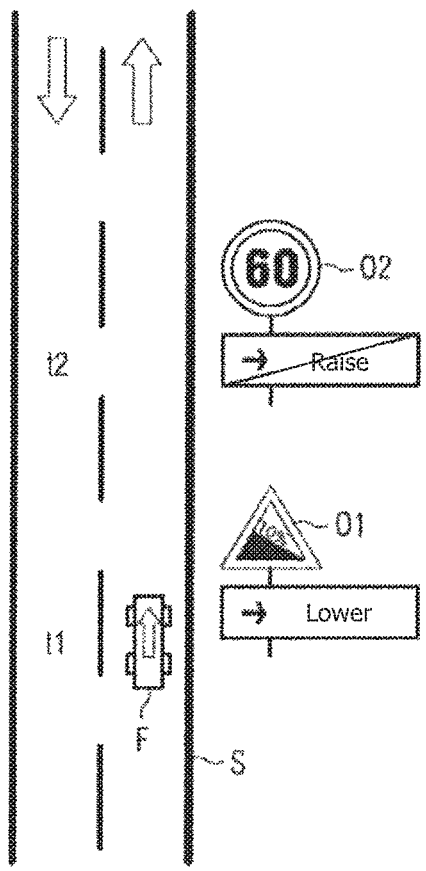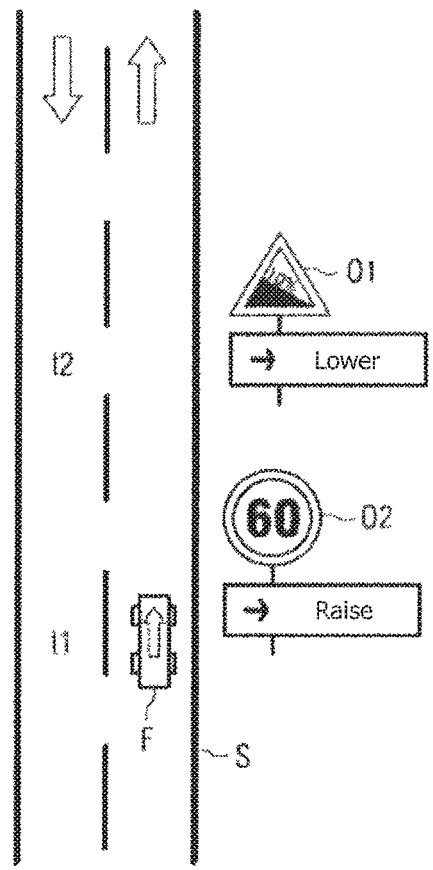

DEVICE AND METHOD FOR CONTROLLING A HEADLAMP OF A MOTOR VEHICLE

CROSS REFERENCE TO RELATED APPLICATIONS

This application claims priority to German Patent Application No. 10 2015 207 543.5, filed Apr. 24, 2015, the contents of such application being incorporated by reference herein.

FIELD OF THE INVENTION

The invention relates to a device and a method for controlling a headlamp of a motor vehicle, in particular a vehicle headlamp having a variable light characteristic.

BACKGROUND OF THE INVENTION

Driver assistance systems are increasingly used in motor vehicles, in particular cars, trucks or motorcycles. Conventional driver assistance systems also help to automatically adjust vehicle headlamps with different light distributions. The adjustment of the light distribution is thereby usually based on a recognized current driving situation of the motor vehicle in question. Traffic indicators in the vehicle's surroundings can be taken into account as well.

DE 10 2013 213 375 A1, which is incorporated by reference describes a method for controlling the light distribution produced by one headlamp on a motor vehicle. In this case, a camera system onboard the motor vehicle images a scene ahead of the motor vehicle and this scene is subsequently evaluated. Finally, the light distribution produced by the at least one headlamp of the motor vehicle is controlled as a function of the result of the image evaluation. In the course of the image evaluation, traffic indicators are detected in the method described in DE 10 2013 213 375 A1 and compared with stored patterns. In the case of a recognized correspondence between a detected traffic indicator and a specific stored pattern, a light distribution which is assigned to the stored pattern is automatically adjusted from a multiplicity of possible different light distributions. FIG. 1 shows a table listing road signs and the associated light distributions which are switched on, off or over when the respective road sign is recognized, which is used in this conventional method.

However, the disadvantage of the method for controlling the light distribution described in DE 10 2013 213 375 A1 is that it does not operate reliably and/or it can easily be disrupted. This is explained below with reference to the traffic situations illustrated in FIGS. 2A, 2B and 3A, 3B.

As can be seen in FIG. 2A, a vehicle F is moving on a roadway and/or road and passes a first road sign VS1 which shows a 10 percent downhill gradient of the road, at a time t1. In the conventional method, in accordance with the table shown in FIG. 1, the headlamps of the vehicle F are consequently lowered in order, on the one hand, to better illuminate the road ahead of the vehicle and, on the other hand, to dazzle other road users, which are approaching the vehicle on the other side of the road, less. If, for example, in the traffic situation illustrated in FIG. 2A, the vehicle F passes the second road sign VS2 which indicates a speed limit of 60 km/h, after a few meters, at a time t2, the headlamps of the vehicle F are raised again in accordance with the table illustrated in FIG. 1. The consequence of this is that if the road continues to descend, the road ahead of the vehicle is only poorly illuminated due to the raised vehicle headlamps and, at the same time, drivers of oncoming vehicles are dazzled.

In the traffic situation illustrated in FIG. 2B, the vehicle F first passes a road sign VS3 which displays a speed limit and then a road sign VS4 which indicates a downhill gradient of the road of 10%. In both of the traffic situations illustrated in FIGS. 2A, 2B, the order of the road signs is therefore reversed. In the traffic situation illustrated in FIG. 2B, the vehicle headlamps are first raised and then lowered in accordance with the table illustrated in FIG. 1. In the traffic situation illustrated in FIG. 2B, due to the order in which the vehicle passes the two road signs VS3, VS4 which happens to coincide with said vehicle descending the downhill gradient, the road ahead of the vehicle is illuminated in an advantageous manner due to the lowered vehicle headlamp, at the same time preventing oncoming road users from being dazzled. As is clear from FIGS. 2A, 2B, the illumination of the roadway in the conventional method is therefore dependent on the order of the road signs located at the edge of the road. This is also made clear by means of the example illustrated in FIGS. 3A, 3B. In the example illustrated in FIG. 3A, the vehicle F first passes a road sign VS5 which indicates the possibility of wild animals crossing. In accordance with the table indicated in FIG. 1 dipped headlights and a turn light are activated, in order to better illuminate the lateral edge of the road. The vehicle F then passes a road sign VS6 which indicates a speed limit of 60 km/h at a time t2. In accordance with the default according to the table in FIG. 1, the headlamps of the vehicle F are consequently automatically raised. If, for example, the road sign VS6 is located just a few meters behind the road sign VS5, the vehicle does not drive through the danger area in which wild animals may cross in accordance with the default indicated for the road sign VS5, but in accordance with the default for the speed limit traffic indicator VS6. FIG. 3B shows the reverse order where a road sign VS7 first indicates a speed limit and then a road sign VS8 displays the hazard of wild animals crossing. When the two road signs VS7, VS8 are in this order, the headlamps of the vehicle F are first raised at a time t1 and then the dipped headlights and the turn light are switched on at a time t2 in order to illuminate the lateral areas of the road in accordance with the table in FIG. 1. As can be seen by comparing FIGS. 3A and 3B, the vehicle headlamps are controlled here as well depending on the random order of the two road signs.

In the conventional control method, as described in DE 10 2013 213 375 A1, there is therefore a risk that, on the one hand, the road ahead of the vehicle is not optimally illuminated and, on the other hand, drivers of oncoming vehicles may be significantly dazzled.

SUMMARY OF THE INVENTION

Therefore an aspect of this invention provides a method and a device for controlling a headlamp of a motor vehicle, in which a roadway ahead of the motor vehicle is optimally illuminated and dazzling of oncoming road users is prevented.

An aspect of the invention therefore provides a driver assistance system for a motor vehicle, wherein the driver assistance system comprises at least one vehicle camera for detecting the vehicle surroundings and a control device having an image data processing unit which is provided for evaluating the image data supplied by the vehicle camera in order to recognize objects along a road being driven on by the motor vehicle, wherein the control device controls at least one headlamp of the motor vehicle as a function of the recognized objects and the respective object priorities thereof in order to illuminate the vehicle surroundings.

In one possible embodiment of the driver assistance system according to the invention, the control device evaluates a table stored in a data storage device, which indicates an associated illumination default and an object priority respectively for different objects.

In another possible embodiment of the driver assistance system according to the invention, the objects contained in the table of the data storage device include traffic indicators, in particular road signs, roadway markings and traffic lights, street lights and headlamps or light signals of other oncoming vehicles or vehicles driving ahead of the motor vehicle, in particular of other motor vehicles, or oncoming bicycles or bicycles traveling ahead of the motor vehicle as well as road structures, in particular vehicle tunnels.

In another possible embodiment of the driver assistance system according to the invention, the control device additionally controls the at least one headlamp of the motor vehicle as a function of a recognized direction of movement and/or speed of movement of the recognized object relative to the motor vehicle.

In another possible embodiment of the driver assistance system according to the invention, the control device controls the at least one vehicle headlamp as a function of a current vehicle inclination, vehicle trajectory and/or vehicle speed of the motor vehicle detected by sensor.

In another possible embodiment of the driver assistance system according to the invention, the control device controls the at least one vehicle headlamp as a function of a recognized order of the recognized objects along the road being driven on by the motor vehicle, wherein subsequent objects having a lower object priority are suppressed, if one or more objects have a higher object priority and the objects are located on one and the same stretch of road.

In another possible embodiment of the driver assistance system according to the invention, the control device controls an orientation and/or light intensity and/or form of a light cone of the vehicle headlamp.

An aspect of the invention additionally provides a method for controlling a headlamp of a motor vehicle.

An aspect of the invention therefore provides a method for controlling a headlamp of a motor vehicle comprising the following steps:

Detection of the surroundings of the motor vehicle by a vehicle camera,

Evaluation of the image data supplied by the vehicle camera in order to recognize objects along a road being driven on by the motor vehicle, and Controlling of the vehicle headlamp as a function of the recognized objects and the object priorities thereof.

In one possible embodiment of the method according to the invention, the vehicle headlamp is additionally controlled as a function of a recognized direction of movement and/or speed of movement of the recognized object relative to the motor vehicle.

In another possible embodiment of the method according to the invention, the object priorities are read out from a table of a data storage device in which an object priority and an illumination default are indicated respectively for different objects.

In another possible embodiment of the method according to the invention, the vehicle headlamp is controlled as a function of a current vehicle inclination, vehicle trajectory and/or vehicle speed of the motor vehicle detected by sensor.

In another possible embodiment of the method according to the invention, the vehicle headlamp is controlled as a function of a recognized order of the recognized objects along the road being driven on by the motor vehicle, wherein subsequent objects having a lower object priority are suppressed, if one or more objects have a higher object priority and the objects are located on one and the same stretch of road.

In another possible embodiment of the method according to the invention, an orientation and/or light intensity and/or form of a light cone of the vehicle headlamp is/are controlled.

According to a further aspect of the invention a control device of a driver assistance system is additionally provided.

An aspect of the invention therefore provides a control device of a driver assistance system which is set up to carry out a method for controlling a headlamp of a motor vehicle, wherein the surroundings of the motor vehicle are detected by a vehicle camera, and the image data supplied by the vehicle camera is evaluated in order to recognize objects along a road being driven on by the motor vehicle, and the headlamps of the vehicle are controlled as a function of the recognized objects and the object priorities thereof.

According to a further aspect of the invention a motor vehicle having a driver assistance system with the features indicated in claim 15 is additionally provided.

The invention therefore provides a motor vehicle, in particular a car or truck, having a driver assistance system, wherein the driver assistance system comprises at least one vehicle camera for detecting the vehicle surroundings and a control device having an image data processing unit which is provided for evaluating the image data supplied by the vehicle camera in order to recognize objects along a road being driven on by the motor vehicle, wherein the control device controls at least one headlamp of the motor vehicle as a function of the recognized objects and the respective object priorities thereof in order to illuminate the vehicle surroundings.

BRIEF DESCRIPTION OF THE DRAWINGS

In addition, preferred embodiments of the device according to the invention and of the method for controlling a headlamp of a motor vehicle according to the invention will be explained in greater detail, with reference to the attached figures, wherein:

FIG. 1 shows a table for controlling a vehicle headlamp, which is used in a conventional driver assistance system;

FIGS. 2A, 2B show a first traffic situation for explaining one problem underlying the method according to an aspect of the invention and the device according to an aspect of the invention;

FIGS. 3A, 3B show a further traffic situation for illustrating one problem underlying the method according to an aspect of the invention and the device according to an aspect of the invention;

FIG. 6 shows one embodiment example of a table used in the method according to an aspect of the invention and in the device according to an aspect of the invention;

FIGS. 7A, 7B show a traffic situation, by way of example, in order to illustrate the functioning principle of the device according to an aspect of the invention and the method for controlling a headlamp on a motor vehicle according to an aspect of the invention.

DETAILED DESCRIPTION OF THE PREFERRED EMBODIMENTS

Figure 4:
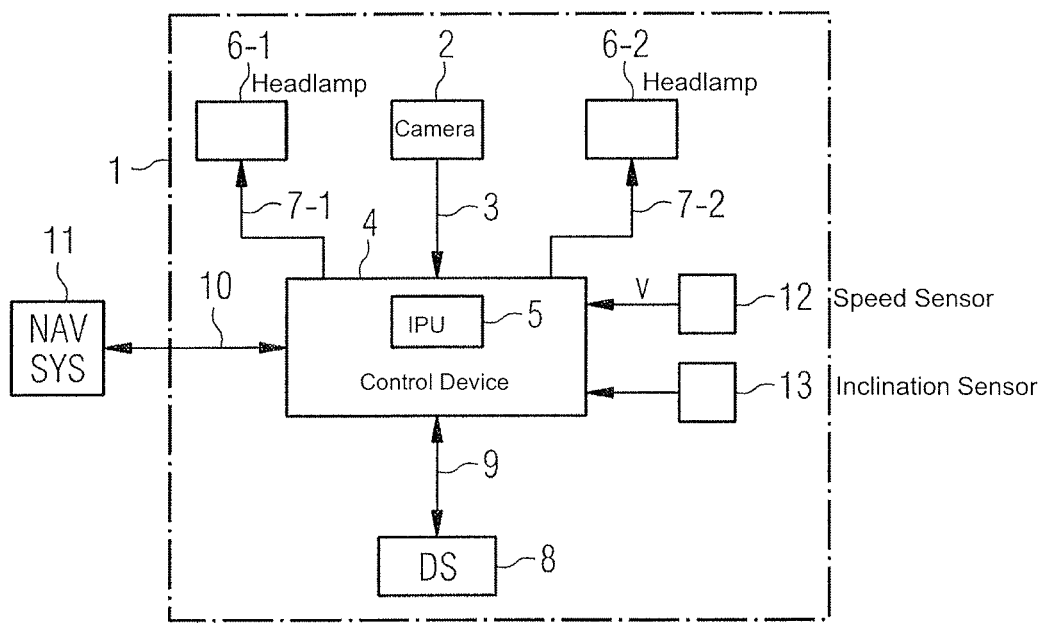
FIG. 4 shows a block wiring diagram for illustrating one embodiment example of the driver assistance system according to an aspect of the invention in accordance with an aspect of the invention.

As can be seen from FIG. 4, a driver assistance system 1 according to an aspect of the invention for a motor vehicle F comprises at least one vehicle camera 2 for detecting the vehicle surroundings in the illustrated embodiment example. The number of vehicle cameras 2 used can vary. In a preferred embodiment at least one vehicle camera 2 is located at the front of the motor vehicle in question. In an alternative embodiment, a plurality of vehicle cameras can also be provided, which supply a surround view of the vehicle for example. The vehicle camera 2 continually optically detects the vehicle's surroundings and supplies image data via a signal line 3, preferably in real time, to a control device 4 in which an image data processing unit 5 is integrated. The image data processing unit 5 evaluates the image data supplied by the vehicle camera 2 in order to recognize objects along a road being driven on by the motor vehicle. The control device 4 controls at least one vehicle headlamp 6-1, 6-2 by means of control lines 7-1, 7-2 as a function of the recognized objects and the respective object priorities thereof in order to illuminate the vehicle's surroundings. To this end, the control device 4 preferably accesses a data storage device 8 via a data interface or data bus 9, in which data storage device a table is stored which indicates an associated illumination default and an object priority respectively for different objects. In one possible embodiment, the control device 4 can additionally be connected via a further data interface 10 with a navigation system 11 of the vehicle. In the embodiment example illustrated in FIG. 4, the control device 4 additionally receives sensor data from a speed sensor 12 which detects the vehicle's speed and a sensor 13 which detects the vehicle's current inclination. In further embodiments additional sensors can be provided and supply additional sensor data to the control device 4, in particular with respect to the direction of movement and/or speed of movement of a recognized object relative to the body of the motor vehicle. Furthermore, sensors can supply data with respect to the trajectory of the motor vehicle.

FIG. 6 shows, by way of example, a table which can be stored in the data storage device 8 of the driver assistance system 1. The control device 4 controls the at least one headlamp 6-1, 6-2 of the motor vehicle as a function of recognized objects and the respective object priorities thereof in order to illuminate the vehicle surroundings. In one possible embodiment the objects contained in the table of the data storage device 8 include traffic indicators, in particular road signs, as shown in FIG. 6. An associated illumination default and an object priority respectively are indicated for each object in the stored table. In the example illustrated in FIG. 6, the objects include road signs which describe different traffic situations. An associated illumination default and an associated object priority are indicated in the table for each of these objects and/or road signs. Thus, for example, the downhill gradient road sign has the highest object priority 1 with the illumination default to lower the vehicle headlamps. On the other hand, the uphill gradient road sign has the lowest object priority 4 with the illumination default to raise the light cone of the vehicle headlamp.

In the embodiment example illustrated in FIG. 6, four different object priorities are allocated and stored for the different objects. In another embodiment example the number of priority levels can vary. A road sign which displays a downhill gradient ahead of the vehicle has the highest priority level in the illustrated embodiment example. The reason for this relatively high priority level is that a downhill gradient ahead of the vehicle can particularly easily result in unintentional dazzling of oncoming traffic and, at the same time, non-lowered vehicle headlamps result in only insufficient illumination of the roadway ahead of the vehicle. It is therefore particularly important in the traffic situation indicated by this road sign to lower the vehicle's headlamps sufficiently. The next highest priority level 2 is, in the embodiment example illustrated in FIG. 6, indicated for the stop sign, yield, traffic circle, pedestrian zone, 30 km/h speed limit zone, play street and crosswalk road signs. For example, if the object is recognized as being a stop sign, the light cone of the vehicle headlamp is expanded and a turn light is activated. The pedestrians and wild animals crossing warning signs and entrance to a town road sign, as illustrated in FIG. 6, have the next highest priority level 3. The uphill gradient, interstate highway, road restricted to motor vehicles road signs and a speed limit traffic indicator have the lowest priority level 4.

The table stored in the data storage device 8 of the driver assistance system 1 can preferably be configured via an interface. The table can be configured with respect to the objects stored in the table, both in terms of the associated illumination default and in terms of the object priority provided for the object. Different configurations for different vehicles and/or vehicle types can be stored in the data storage device 8. In one possible embodiment, the table can additionally be automatically reconfigured as a function of an operating condition of the motor vehicle or of the driver assistance system 1. For example, in the event of one vehicle headlamp failing, the table can be automatically reconfigured with respect to the illumination default and/or the object priority from a group of existing motor vehicle headlamps. Furthermore, the configuration, in particular the object priority, can, in one possible embodiment, depend on additional factors, for example the time of day and the lighting conditions and/or weather conditions in the vehicle's surroundings.

In the example illustrated in FIG. 6, the table contains traffic indicators, in particular road signs, as objects. In another possible embodiment, additional objects with their associated object priorities and illumination defaults are stored in the table of the data storage device 8. These objects include, for example, particular roadway markings or traffic lights, street lights. Additional possible objects are recognized headlamps or light signals of other oncoming vehicles or vehicles driving ahead of the motor vehicle, in particular of other motor vehicles. Additional possible objects are headlamps or light signals of other oncoming vehicles or vehicles driving ahead of the motor vehicle, in particular bicycles or the like. Additional objects include road structures, in particular vehicle tunnels, which can be automatically recognized based on the particular shape of the tunnel entrance.

The control device 4 automatically controls one or more headlamps 6-i of the motor vehicle as a function of the recognized objects and the respective object priorities thereof in order to illuminate the vehicle surroundings in accordance with the illumination default stored in the table. In another possible embodiment, the control device 4 additionally controls the at least one headlamp 6-i of the motor vehicle as a function of a recognized direction of movement and/or speed of movement of the recognized object relative to the motor vehicle. Furthermore, in another possible embodiment, the control device 4 automatically controls the at least one vehicle headlamp 6-$i$ as a function of a current vehicle inclination, vehicle trajectory or vehicle speed V of the motor vehicle detected by sensor. As a result, a virtually optimum illumination of the vehicle surroundings, in particular of the roadway ahead of the vehicle, can be achieved, taking account of the recognized objects and the object priorities thereof.

In another possible embodiment, the control device 4 controls the at least one vehicle headlamp 6-$i$ as a function of a recognized order of the recognized objects along the road being driven on by the motor vehicle, wherein subsequent objects having a lower object priority are suppressed, if one or more objects have a higher object priority and the objects are located on the same stretch of road. The control device 4 controls the vehicle headlamps 6-$i$ by means of corresponding control lines 7-$i$. In the process, the control device 4, can, on the one hand, control the orientation and/or the light intensity and, on the other hand, the form of a light cone of the relevant vehicle headlamp 6-$i$.

Figure 5:
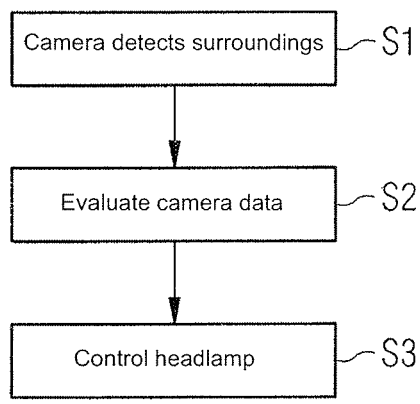
FIG. 5 shows a flow chart for illustrating an embodiment example of the method for controlling a headlamp of a motor vehicle according to an aspect of the invention.

FIG. 5 shows a simple flow chart in order to illustrate one embodiment example of the method for controlling a headlamp on a motor vehicle according to the invention. The surroundings of the motor vehicle are first detected by sensor by a camera of the vehicle in a step S1. In a further step S2, the image data supplied by the vehicle camera in order to recognize objects along a road being driven on by the motor vehicle is evaluated. Finally, at least one headlamp of the vehicle is controlled as a function of the recognized objects and the object priorities thereof by the control device 4 of the driver assistance system 1 in step S3. In one possible embodiment, the control device 4 of the driver assistance system 1 comprises at least one microprocessor for running a suitable control program and for carrying out the method illustrated in FIG. 5. This control program preferably accesses a data storage device in which a corresponding table with different objects, object priorities and illumination defaults is stored.

FIGS. 7A, 7B serve to clarify the mode of operation of the device according to the invention and of the method for controlling a headlamp of a motor vehicle according to the invention. As can be seen in FIG. 7A, a motor vehicle F which has a driver assistance system 1 is moving on the right lane of a public highway S and passes an object O1 at a time t1. In the illustrated embodiment example, this object O1 is a road sign which indicates a downhill gradient of the road S. The image data processing unit 5 of the control device 4 of the driver assistance system 1 evaluates the image data supplied by a camera 2 of the vehicle F and recognizes the road sign O1 erected in the road S. The control device 4 of the driver assistance system 1 then accesses the table stored in the data storage device 8, as illustrated for example in FIG. 6. The control device 4 recognizes and reads out the object priority of the recognized object O1 and controls the headlamps 6-$i$ of the vehicle F in accordance with the associated illumination default "Lower". If the vehicle F then passes an additional object O2 having a lower object priority, for example a speed limit road sign, at a time t2, the corresponding illumination default of the object O2 is disregarded. As a consequence, the headlamps 6-$i$ of the vehicle remain lowered and the descending road S is, in addition, optimally illuminated with lowered vehicle headlamps. In addition, the headlamps are prevented from unintentionally dazzling oncoming road users as the motor vehicle descends the downhill gradient. FIG. 7B shows a comparable traffic situation with exchanged traffic indicators. As illustrated in FIG. 7B, the vehicle F first passes a speed limit road sign as object O2 at a time t1, so that the headlamps of the vehicle F are raised in accordance with the illumination default. If the vehicle F then passes the subsequent downhill gradient road sign at a time t2, the headlamps of the vehicle F are automatically lowered in accordance with the illumination default due to the higher object priority of the object O1 compared with the object priority of the object O2, so that as the vehicle then descends this downhill gradient the descending roadway of the road S is optimally illuminated and dazzling of oncoming road users is reliably prevented. As can be seen by comparing the two traffic situations according to FIGS. 7A and 7B, the order of the two erected road signs is not important, so that in both cases after passing the two road signs the headlamps 6-$i$ of the vehicle F are lowered, thus illuminating the roadway in the best possible way. As a result, the road safety of the vehicle F and of other vehicles is significantly increased. With the method according to the invention unintentional dazzling of any oncoming vehicles is reliably prevented and, at the same time, the roadway of the vehicle F is illuminated in the best possible way.

Additional embodiments of the method according to the invention and of the device according to the invention are possible. In one possible embodiment, not only is the type of erected road sign objects recognized, but its contents are also additionally evaluated. In one possible embodiment, the image data processing unit 5 of the control device 4 not only recognizes, for example, that a road sign is erected which displays a downhill gradient, but also how steep this downhill gradient is. For example, the image data processing unit 5 in the example illustrated in FIGS. 7A and 7B recognizes that the object O1 is a road sign which indicates a downhill gradient of precisely 10°. The control device 4 then lowers the vehicle headlamps 6-$i$ according to a downhill gradient of the road of 10°. If, for example, the image data processing unit 5 recognizes that the recognized road sign indicates a steeper downhill gradient of, for example, 30°, the headlamps 6-$i$ of the vehicle F are accordingly lowered to a greater extent.

In another possible embodiment the control device 4 additionally makes possible criteria which end the corresponding illumination default. For example, the vehicle F driving by an object O1 (downhill gradient of 10%) therefore results in at least one headlamp 6-$i$ of the vehicle automatically being lowered. This illumination default applies in one possible embodiment until such time as a particular cancellation criterion is met. For example, the illumination default is observed by the control device 4 of the driver assistance system 1 until such time as a particular distance has been covered by the vehicle on the road after passing the road sign. Alternatively, the corresponding illumination default can be observed by the control device 4 until such time as a sensor displays that the downward gradient stretch along the road has ended and the vehicle is moving extensively horizontally on the road S. Furthermore, other road signs, in particular cancellation signs, can also act as an abort criterion. For example, an end of speed limit road sign can be used to end the illumination default for a speed limit sign. The method according to the invention and the device for controlling vehicle headlamps according to the invention can be used for different types of vehicles, in particular for motor vehicles, for example trucks or cars or motorcycles. In one possible embodiment, the data storage device 8 illustrated in FIG. 4 is integrated in the driver assistance system 1. Alternatively, a reading unit for reading out a portable data storage device can be provided, for example, a memory card. In one possible embodiment the illumination default adjusted by means of the control device 4 is displayed to the driver of the vehicle F via a user interface. By taking account of object priorities clear illumination and/or light adjustment can be effected by means of the control device 4.

The invention claimed is:

1. A driver assistance system for a motor vehicle, wherein the driver assistance system comprises:
at least one vehicle camera for detecting the vehicle surroundings; and
a control device having an image data processing unit which is provided for evaluating image data supplied by the vehicle camera in order to recognize a plurality of different objects along a road being driven on by the motor vehicle,
wherein the control device determines priority values assigned to each of the recognized objects, and controls at least one headlamp of the motor vehicle as a function of the recognized objects and their respective priority values in order to illuminate the vehicle surroundings.

2. The driver assistance system according to claim 1, wherein the control device evaluates a table stored in a data storage device, which indicates an associated illumination default and an object priority respectively for different objects.

3. The driver assistance system according to claim 2, wherein the objects contained in the table of the data storage device comprise traffic indicators, selected from the group consisting of road signs, roadway markings, traffic lights, street lights, and headlamps or light signals of other oncoming vehicles or vehicles traveling ahead of the motor vehicle, or oncoming bicycles or bicycles traveling ahead of the motor vehicle as well as road structures.

4. The driver assistance system according to claim 1, wherein the control device additionally controls the at least one headlamp of the motor vehicle as a function of a recognized direction of movement and/or speed of movement of the recognized object relative to the motor vehicle.

5. The driver assistance system according to claim 1, wherein the control device controls the at least one vehicle headlamp as a function of at least one of a current vehicle inclination, vehicle trajectory, and vehicle speed of the motor vehicle detected by a sensor.

6. The driver assistance system according to claim 1, wherein the control device controls the at least one vehicle headlamp as a function of a recognized order of the recognized objects along the road being driven on by the motor vehicle, wherein subsequent objects having a lower object priority are suppressed, if one or more objects have a higher object priority and the objects are located on the same stretch of road.

7. The driver assistance system according to claim 1, wherein the control device controls at least one of an orientation, light intensity, and form of a light cone of the vehicle headlamp.

8. A method for controlling a headlamp of a motor vehicle comprising:
(a) detecting, by a vehicle camera, the surroundings of the motor vehicle;
(b) evaluating, by a vehicle processor, image data supplied by the vehicle camera in order to recognize a plurality of different objects along a road being driven on by the motor vehicle;
(c) determining, by the vehicle processor, priority values assigned to each of the recognized objects; and
(d) controlling, by the vehicle processor, the vehicle headlamp as a function of the recognized objects and their priority values in order to illuminate the vehicle surroundings.

9. The method according to claim 8, wherein the vehicle headlamp is additionally controlled as a function of a recognized direction of movement and/or speed of movement of the recognized object relative to the motor vehicle.

10. The method according to claim 9, wherein the object priorities are read out from a table of a data storage device, in which an object priority and an illumination default are indicated respectively for different objects.

11. The method according to claim 8, wherein the object priorities are read out from a table of a data storage device, in which an object priority and an illumination default are indicated respectively for different objects.

12. The method according to claim 8, wherein the vehicle headlamp is controlled as a function of a current vehicle inclination, vehicle trajectory, and vehicle speed of the motor vehicle detected by a sensor.

13. The method according to claim 8, wherein the vehicle headlamp is controlled as a function of a recognized order of the recognized objects along the road being driven on by the motor vehicle, wherein subsequent objects having a lower object priority are suppressed, if one or more objects have a higher object priority and the objects are located on the same stretch of road.

14. The method according to claim 8, wherein at least one of an orientation, light intensity and form of a light cone of the vehicle headlamp are controlled.

15. A control device of a driver assistance system adapted to carry out a method for controlling a headlamp of a motor vehicle comprising:
(a) detecting, by a vehicle camera, the surroundings of the motor vehicle by a vehicle camera;
(b) evaluating, by a vehicle processor, image data supplied by the vehicle camera in order to recognize a plurality of different objects along a road being driven on by the motor vehicle; and
(c) determining priority values assigned to each of the recognized objects, and
(d) controlling, by the vehicle processor, the vehicle headlamp as a function of the recognized objects and their priority values in order to illuminate the vehicle surroundings.

16. A motor vehicle having a driver assistance system, wherein the driver assistance system comprises: at least one vehicle camera for detecting the vehicle surroundings; and a control device having an image data processing unit which is provided for evaluating image data supplied by the vehicle camera in order to recognize a plurality of different objects along a road being driven on by the motor vehicle, wherein the control device determines priority values assigned to each of the recognized objects, and controls at least one headlamp of the motor vehicle as a function of the recognized objects and their respective priority values in order to illuminate the vehicle surroundings.

* * * * *